United States Patent [19]

Oyama

[11] Patent Number: 4,792,996
[45] Date of Patent: Dec. 20, 1988

[54] INFORMATION MEDIUM FOR COMMUNICATING DATA AND/OR A SELECTABLE CONTROL TRANSFER PROGRAM BETWEEN THE MEDIUM END AND EXTERNAL DEVICE

[75] Inventor: Masumi Oyama, Tokyo, Japan

[73] Assignee: Kabushiki Kaisha Toshiba, Kawasaki, Japan

[21] Appl. No.: 909,326

[22] Filed: Sep. 19, 1986

[30] Foreign Application Priority Data

Sep. 27, 1985 [JP] Japan ................... 60-213712

[51] Int. Cl.⁴ .............................................. H04B 9/00
[52] U.S. Cl. .................................... 455/617; 455/603; 455/606; 364/192
[58] Field of Search ............... 455/617, 603, 606, 607, 455/608; 340/505, 572; 367/2; 343/721; 370/85, 94; 364/192

[56] References Cited

U.S. PATENT DOCUMENTS

| | | |
|---|---|---|
| 3,427,593 | 2/1969 | Wells et al. . |
| 4,109,311 | 8/1978 | Blum et al. ............................. 370/77 |
| 4,213,119 | 1/1982 | Ward et al. ........................... 455/606 |
| 4,356,509 | 10/1982 | Skerlos et al. ....................... 455/603 |
| 4,367,402 | 1/1983 | Giraud et al. . |
| 4,422,180 | 12/1983 | Wendt . |
| 4,430,704 | 2/1984 | Page et al. . |
| 4,449,206 | 5/1984 | Tokitsu et al. ....................... 455/606 |
| 4,641,374 | 2/1987 | Oyama ................................. 455/606 |

FOREIGN PATENT DOCUMENTS

| | | |
|---|---|---|
| 0040544 | 11/1981 | European Pat. Off. . |
| 0075317 | 3/1983 | European Pat. Off. . |
| 0098659 | 1/1984 | European Pat. Off. . |
| 0100140 | 2/1984 | European Pat. Off. . |
| 0138219 | 4/1985 | European Pat. Off. . |
| 1534832 | 12/1978 | United Kingdom . |
| 2082816 | 3/1982 | United Kingdom . |

Primary Examiner—Douglas W. Olms
Assistant Examiner—Leslie Van Beek
Attorney, Agent, or Firm—Oblon, Fisher, Spivak, McClelland & Maier

[57] ABSTRACT

An information medium comprising a receiving section, a transmitting section, and a transfer-control section. The receiving section receives instructions from an external device. The transmitting section transmits data to the external device. The transfer-control means detects the ID code contained in any instruction information supplied to the receiving section, and changes the transfer program stored in memory when the ID code specifies a program-change instruction. The changed program is supplied to the external device via the transmitting section, so as to be recognized by the external device. Any instruction information supplied to the information medium has an enabling code field, an identification code field, a data field, and an end code field. The transfer-control section includes a control section and a memory unit. The control section operates in accordance with the transfer program stored in the memory unit, thereby to determine which type of instruction information is specified by the ID code written in the identifying code field. The information medium further comprises a drive section for starting and stopping the transmitting section and the control section, in accordance with the enabling code written in the enabling code field, thereby to reduce the power consumption of the medium.

18 Claims, 5 Drawing Sheets

| | | | | |
|---|---|---|---|---|
| A | ENABLING CODE | IDENTIFYING CODE | DATA | END CODE |

| | | | | |
|---|---|---|---|---|
| B | ENABLING CODE | PROGRAM CHANGE CODE | CODE TO DESIGNATE TRANSFER PROGRAM TO BE LOADED | END CODE |

| | | | | |
|---|---|---|---|---|
| C | ENABLING CODE | WRITE CODE | DATA | END CODE |

| | | | | |
|---|---|---|---|---|
| D | ENABLING CODE | READ CODE | DATA AREA TO BE READ OUT/LABEL | END CODE |

FIG. 3

A  PROGRAM CHANGE MODE   | 0 | 1 | 0 | 0 | 1 | 1 | 0 | 1 |

B  WRITE MODE   | 0 | 1 | 1 | 0 | 1 | 0 | 1 | 0 |

C  READ MODE   | 0 | 1 | 1 | 1 | 0 | 0 | 1 | 0 |

D  END MODE   | 0 | 1 | 0 | 1 | 0 | 1 | 0 | 1 |

INFORMATION MEDIUM FOR COMMUNICATING DATA AND/OR A SELECTABLE CONTROL TRANSFER PROGRAM BETWEEN THE MEDIUM END AND EXTERNAL DEVICE

BACKGROUND OF THE INVENTION

This invention relates to an information medium which can be clearly identified, and is thus easily distinguishable from other similar information media.

Such information media are usually available in the form of cards. Each has a memory for storing personal data about its owner. Upon receipt of instruction information from an external device, it sends corresponding data to the external device. The external device decodes the received data and can identify the information medium by means of the decoded data.

U.S. Pat. No. 4,641,374 discloses to the inventor hereof the basic structure of the above-mentioned information medium. The medium claimed in the United States patent does not have hardware components, such as a CPU for controlling a large amount of data.

The conventional information medium has tended to use a standard hardware circuit, to decode external instructions. Hence, the same code pattern is used for all of the media provided with the same instruction-decoding circuit. This allows the owner of one information medium to be able to know the data stored within other media of the same type, in addition to that stored in his or her own information medium.

To prevent this situation from occurring, it is necessary to change the code pattern for each information medium. However, the instruction-decoding circuit is a hardware device, and this inevitably requires that the design of the circuit be altered for each information medium.

Moreover, surrounding noises have sometimes caused the information medium to malfunction. To resolve this problem, the code pattern can be lengthened, to reduce the chance of a malfunction occurring. It has, however, proved difficult to lengthen the code pattern, since the pattern is defined by the hardware; more precisely, by the circuit for decoding external instruction information.

Some of the conventional information media use electric waves or light beams, to transmit data. Media of this type usually have a dry cell provided within them, to supply power to their internal circuits. Consequently, strong demand has arisen for an information medium of this type to be developed, which consumes less power and which can function efficiently.

SUMMARY OF THE INVENTION

Accordingly, the object of the present invention is to provide an information medium, which has the same internal circuit as other media of the same type, but which uses a code pattern different from those of the other media, and can therefore be reliably distinguished from the other media, and which consumes very little power, so that the power source built within it can last a long time.

To attain the above-mentioned object, this invention provides an information medium comprising:

receiving means for receiving instruction information from an external device;

transmitting means for transmitting data to the external device; and transfer-control means for performing one of: an operation for writing the data, contained in the instruction information, into a memory; an operation for reading data from the memory to said transmitting means; and, an operation for changing the data-transfer program stored in the memory, in accordance with the instruction information from said receiving means.

The code pattern used in the information medium of the invention can be altered by changing the data transfer program. Hence, the information medium can use a code pattern different from those of the other media of the same type, though its internal circuit is identical to those of other media. It can thus be reliably distinguished from the other media.

The information medium of the invention can further comprise means for actuating the data transfer control means and data-transmitting means, in response to an enabling code contained in the instruction; means for generating a "power supply stop" code when the instruction is a "stop" instruction; means for comparing the enabling code with a prescribed code and generating a "power supply start" signal when the compared codes are identical; a supply source; and switch means for starting the power supply from the power source to the data transfer control means and data-transmitting means, in response to the "power supply start" signal, and for stopping this power supply in response to the "power supply stop" signal. Power can thus be saved, and the power supply means can last a long time.

DETAILED DESCRIPTION OF THE PREFERRED EMBODIMENTS

The information medium according to a first embodiment of the present invention will now be described with reference to the accompanying drawings.

Figure 1:
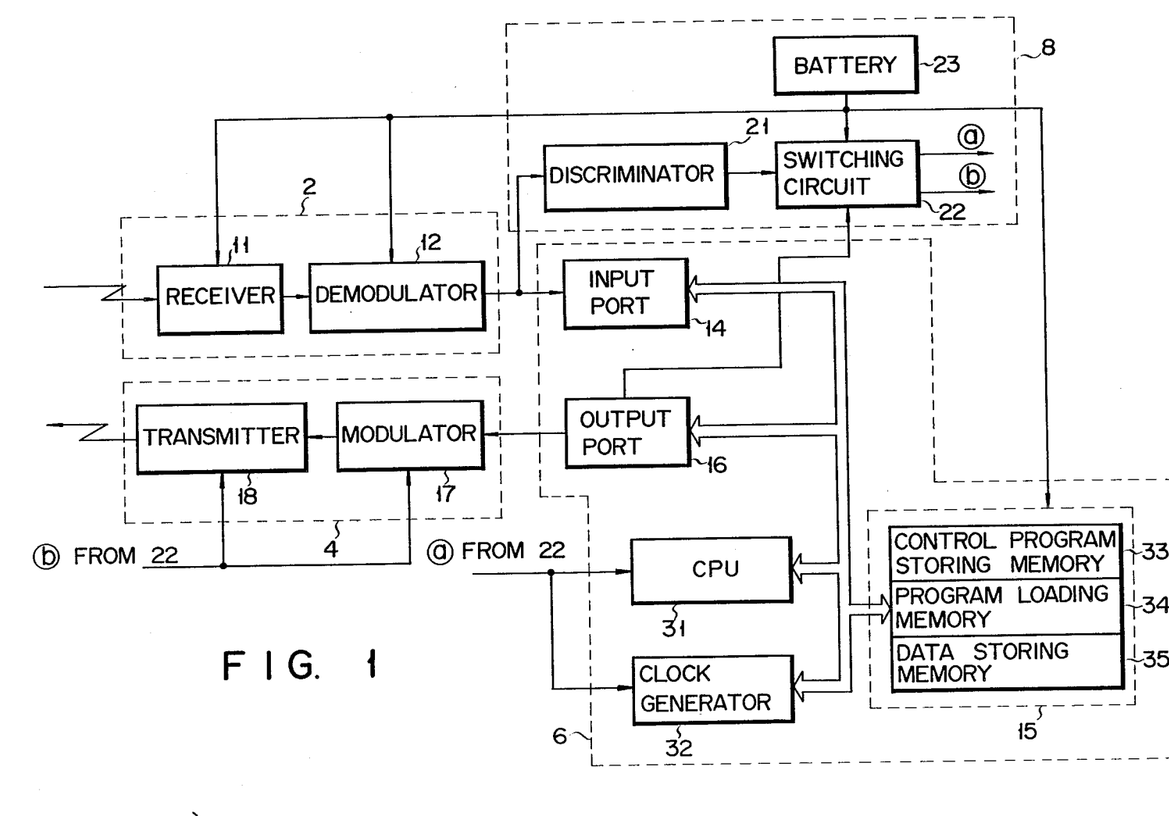
FIG. 1 is a block diagram of the information medium according to a first embodiment of the invention.
Figure 2:
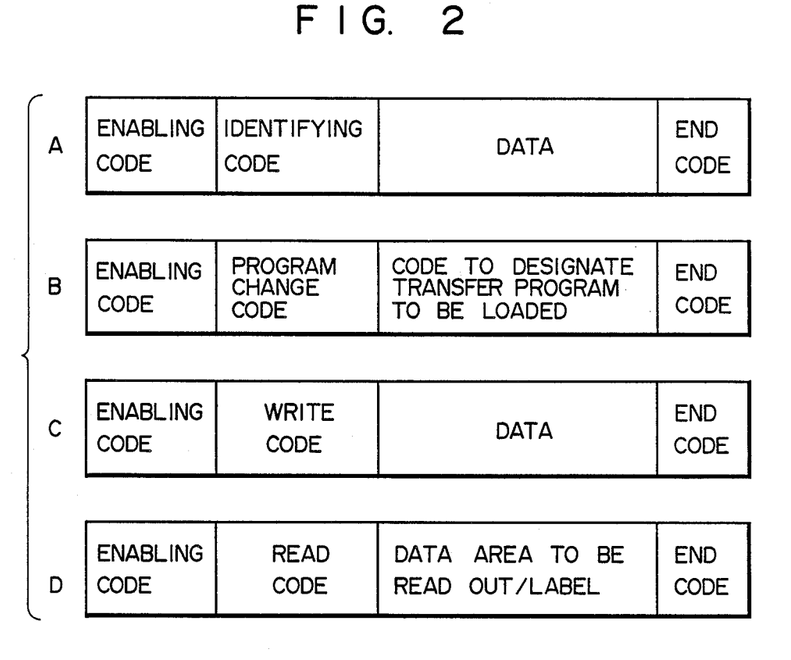
FIG. 2A shows the transmission format of instruction information to the information medium of FIG. 1.
FIG. 2B illustrates the transmission format of a program-change instruction.
FIG. 2C shows the transmission format of a write instruction.
FIG. 2D shows the transmission format of a read instruction.

This information medium comprises receiving section 2 for receiving instruction information from an external device (not shown); transmitting section 4 for transmitting data to the external device; transfer-control section 6 for changing a transfer program, writing the data supplied from the external device via section 2, or reading out data to the external device via section 4, in accordance wtth the instruction information received by section 2; and drive-control section 8 for driving transfer-control section 6 in accordance with the instruction information received by section 2.

Receiving section 2 comprises receiver 11 for receiving a signal, for example, electromagnetic waves, and demodulator 12 for demodulating the signal, which receiver 11 has received, into an instruction information.

Transmitting section 4 comprises modulator 17 for modulating the data from transfer-control section 6 in a predetermined manner, and transmitted 18 for transmitting an output signal from modulator 17, in the form of, for example, electromagnetic waves.

Transfer-control section 6 comprises input port 14, output port 16, memory unit 15, clock generator 32 for generating clock pulses, and CPU 31. Input port 14 receives demodulated data from receiving section 2. Output port 16 supplies data to transmitting section 4, so that this data is modulated by demodulator 12. It also supplies a "power supply stop" signal upon completion of the execution of a series of instruction information. Memory unit 15 is composed of control program storing memory 33 for storing the control program, transfer program-loading memory 34, and data storing memory 35. CPU 31 controls the other components of section 6 in accordance with a program stored in memory unit 15, upon receipt of a clock pulse supplied from clock generator 32.

Drive control section 8 comprises battery 23 (i.e., the internal power source), discriminator 21, and switching circuit 22. Discriminator 21 detects an enabling code from the instruction information demodulated by demodulator 12, and produces a "power supply start" signal. Switching circuit 22 closes in response to the "power supply start" signal, thereby supplying power from battery 23 to CPU 31, clock pulse generator 32, and transmitting section 4. Circuit 22 opens in response to a "power supply stop" signal from transfer control section 6, thereby stopping the power supply to CPU 31, clock pulse generator 32, and transmitting section 4.

When external instruction information is received, power is supplied, via switching circuit 22, to all components of transfer-control section 6, except for memory unit 15. Transmitting section 4 is supplied with power when the external instruction information supplied to section 2 contains a program-change instruction or read instruction information. Memory unit 15 and receiving section 2 are continuously supplied with power via switching circuit 22.

The operation of the information medium embodying the invention will now be described with reference to FIG. 2A to FIG. 4.

A loop antenna in receiver 11 catches the signals supplied from the external device, which carrier waves modulated at the rate of 4800 BPS. Receiver 11, which is tuned to 410 KHz, receives continual carrier waves. The waves are amplified and subjected to a signal-detection process, whereby intermittent carrier signals are taken out and are input to demodulater 12.

Demodulator 12 converts the intermittent carrier signals to digital data signals. In this case, the presence of a carrier signal is denoted by "1", and the absence of a carrier is indicated by "0". The digital data signals are input to input port 14 and discriminator 21.

As is shown in FIG. 2A, the transmission format of external instruction information include an enabling code field, an instruction-identifying code field, a data field, and an end code field.

The enabling code included in the external instruction information is supplied to discriminator 21. Discriminator 21 determines whether or not said enabling code is identical to a predetermined code. If these codes are not identical, no "power supply start" signals are supplied, and the information medium is not made operational.

There are three types of external instruction information. They are:
1. Program-change instruction.
2. Write instruction.
3. Read instruction.

The code specifying the type of an instruction is written in the identifying code field. A program change code is "01001101" (FIG. 3A). A write code is "01101010" (FIG. 3B). A read code is "01110010" (FIG. 3C). An end code is "01010101" (FIG. 3D).

When the code in the identifying code field of the external instruction information specifies a program-change instruction, the transfer program to be loaded into transfer program-loading memory 34 (FIG. 2B) is written in the data field. When this code specifies a write instruction, data to be writtnn in data storing memory is written in the data field. When the code denotes a read instruction, the field storing the data to be read or the label attached to this data, is written in the data field (FIG. 2D). The data field of each type of external instruction information is followed by the end code field in which is recorded the end code indicating the end of the transmission of the instruction information.

The control program stored in control program storing memory 33 (FIG. 1) is common to all information media, according to the invention. This program is stored when the media are manufactured, and it remains unchanged thereafter. A transfer program is loaded in program-loading memory 34 (FIG. 1). This program is used to control CPU 31, in normal conditions. Therefore, upon receipt of instruction information of any of the above-mentioned transmission formats, from demodulator 12, discriminator 21 determines whether or not the enabling code included in this instruction is identical to the predetermined code. If the code is identical, discriminator 21 supplies a "power supply start" signal to switching circuit 22. Circuit 22 supplies power from battery 23 to CPU 31 and clock pulse generator 32, or to transmitting section 4 when the instruction information is a program-change instruction or read instruction. Thus, transfer-control section 6 starts operation in accordance with the transfer program stored in program-loading memory 34.

Figure 4:
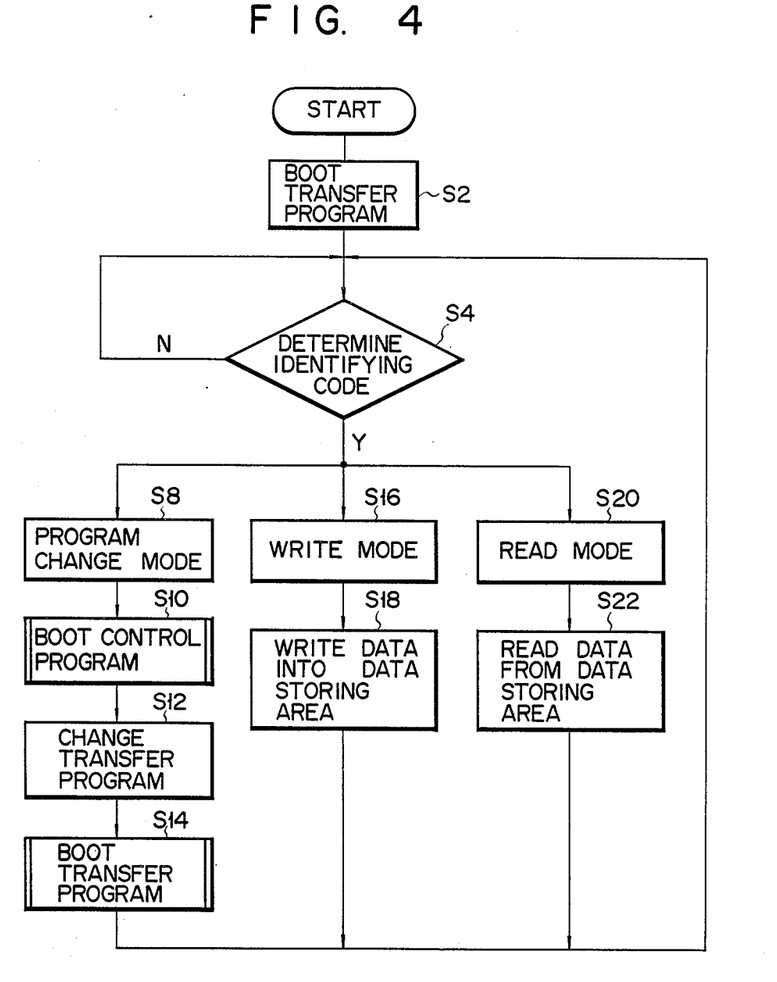
FIG. 4 is a flow chart explaining the operation of the information medium shown in FIG. 1.

The instruction information supplied to input port 14 is processed as is shown in the flow chart of FIG. 4. When power is supplied from battery 23, CPU 31 starts processing the instruction information in accordance with the the transfer program stored in program-loading memory 34 (step S2). First, CPU 31 checks the identifying code contained in the instruction information (step S4), thereby determining which type of instruction this code specifies; for example, a program-change instruction, a write code instruction, or a read code instruction. When the code specifies none of these instructions, the instruction is rejected.

When the identifying code represents a program-change instruction, preparation is made for a change in the program (step S8). More specifically, the value in the program counter is changed (step S8). That is, CPU 31, which has been operating in the transfer-program mode, is set to control-program mode. Then, step S10 ensues.

In step S10, CPU 31 starts operating in accordance with the control program stored in control program storing memory 33. In step S12, CPU 31 writes the transfer program written in the data field, which follows the instruction-identifying code field, into program-loading memory 34.

Later, when the end code in the field following the data field is checked, the transfer program is read from memory 34, to ascertain that this program has been correctly loaded therein. The read-transfer program is transmitted to the external device via transmitting section 4. To be precise, the transfer program is supplied from memory 34, via output port 16, to modulator 17 of transmitting section 4. Modulator 17 performs FSK (frequency-shift keying) modulation on the transfer program; it converts an input "1" bit into a 430 KHz signal, and an input "0" bit into a 430 KHz signal. Transmitter 18 amplifies the output signals of modulator 17 and transmits the amplified signals at the rate of 4800 BPS. The signals are transmitted and received in start-stop synchronization mode, in order to simplify the structure of the information medium.

The new transfer program supplied to an external device is collated with the original transfer program. When it is found, by means of this collation, that the stored program contains an error, the new transfer program is sent back to the information medium. If the stored program is found to have no errors, an end code is transmitted to the information medium. In step S14, in response to this end code, CPU 31 changes the value in a program counter which specifies the step of the control program being executed, to the value denoting the head address of program-loading memory 34. As a result, the program being executed is switched from the control program to the stored transfer program. Then, the flow returns to step S4. CPU 31 then begins operating in accordance with the new transfer program.

When the code in the identifying code field is found, in step S16, to specify a write instruction, the number counted at this time by the program counter is changed, whereby the data-writing subroutine in the transfer program is called. As a result, the data written in the data field of the instruction information is considered to be the data to be written into data storing memory 35, and it is subsequently written therein. When an end code is found in the instruction information, the writing of data is stopped, and the flow returns to step S4. To delete a part of the data, this part is changed to "0" bits, and the all-zero data is written in the data field of the instruction information.

When the code in the identifying code field specifies a read instruction, this is determined to be so in step S20. The number counted by the program counter this time is changed, and the data-reading subroutine of the transfer program is used. In step S22, data is read from data storing memory 35, in accordance with the data written in the data field. More specifically, when the data written in the data field designates a specific portion of the data stored in memory 35, this portion is read therefrom; when the data in the data field represents a label, the data identified by this label is read from memory 35.

The data thus read from memory 35 is transmitted to the external device via modulator 17 and transmitter 18. When the data-reading process ends, the flow returns to step S4.

Figure 3:
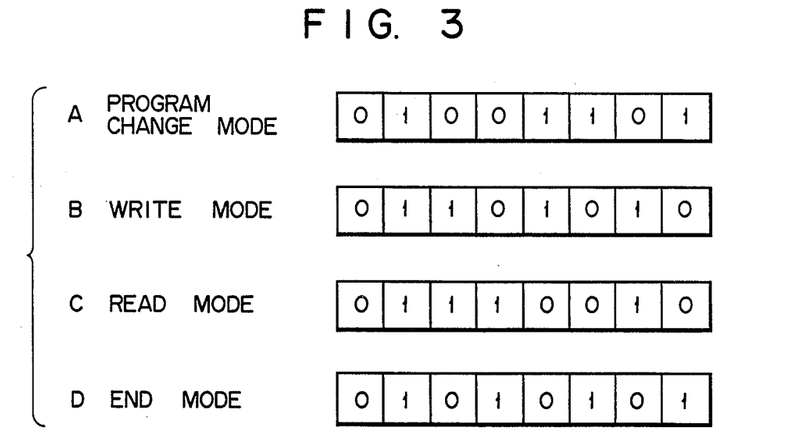
FIGS. 3A, 3B, and 3C show ID codes specifying a program-change instruction, a write instruction, and a read instruction.
FIG. 3D illustrates the pattern of an end code.

The enabling code, not shown in FIG. 3, is disclosed in U.S. Pat. No. 4,641,374. As was mentioned above, the information medium of this invention goes into full operation upon receipt of the enabling code. When all controls designated by the instruction information have been executed in accordance with the control program or transfer program, the "power supply stop" signal is supplied to switching circuit 22 via output port 16. Switching circuit 22 is thereby switched to the "off" condition. As a result, the power supply from battery 23 to the internal components of the medium is stopped, and the information medium returns to the waiting condition.

In the above embodiment, if an identifying code pattern is not found in the predetermined patterns within the transfer program, the data-receiving operation can be stopped upon lapse of a predetermined time after detection of the absence of the identifying code, and then a "power supply stop" signal can be output.

With the information medium dsscribed above, the bit pattern of the identifying code is contained in the transfer program, thereby making it possible to change the data-transfer program by remote control. Therefore, any information medium embodying the invention can store any information-transfer program the user chooses, even though they all have the same hardware structure. The information medium of the invention is advantageous in that it is adaptable for various purooses, and the power of its built-in power source is efficiently conserved, since power is used only during the control operation.

In the above embodiment, memory unit 15 is a RAM. However, control program storing memory 33 provided within unit 15 can be a ROM.

The embodiment described above is of the type in which instruction information is transmitted, to the medium, by means of electromagnetic waves of the intermediate frequency band. Alternatively, the instruction information can be transmitted in the form of either light pulses or sound waves, provided receiver 12 and transmitter 18 are replaced by an optical receiver and a transmitter, or by an acoustic receiver and a transmitter.

The information medium can be used semi-permanently if battery 23 is charged with strong electromagnetic waves, by a fully chargeable secondary battery or by a large capacitor.

Figure 5:
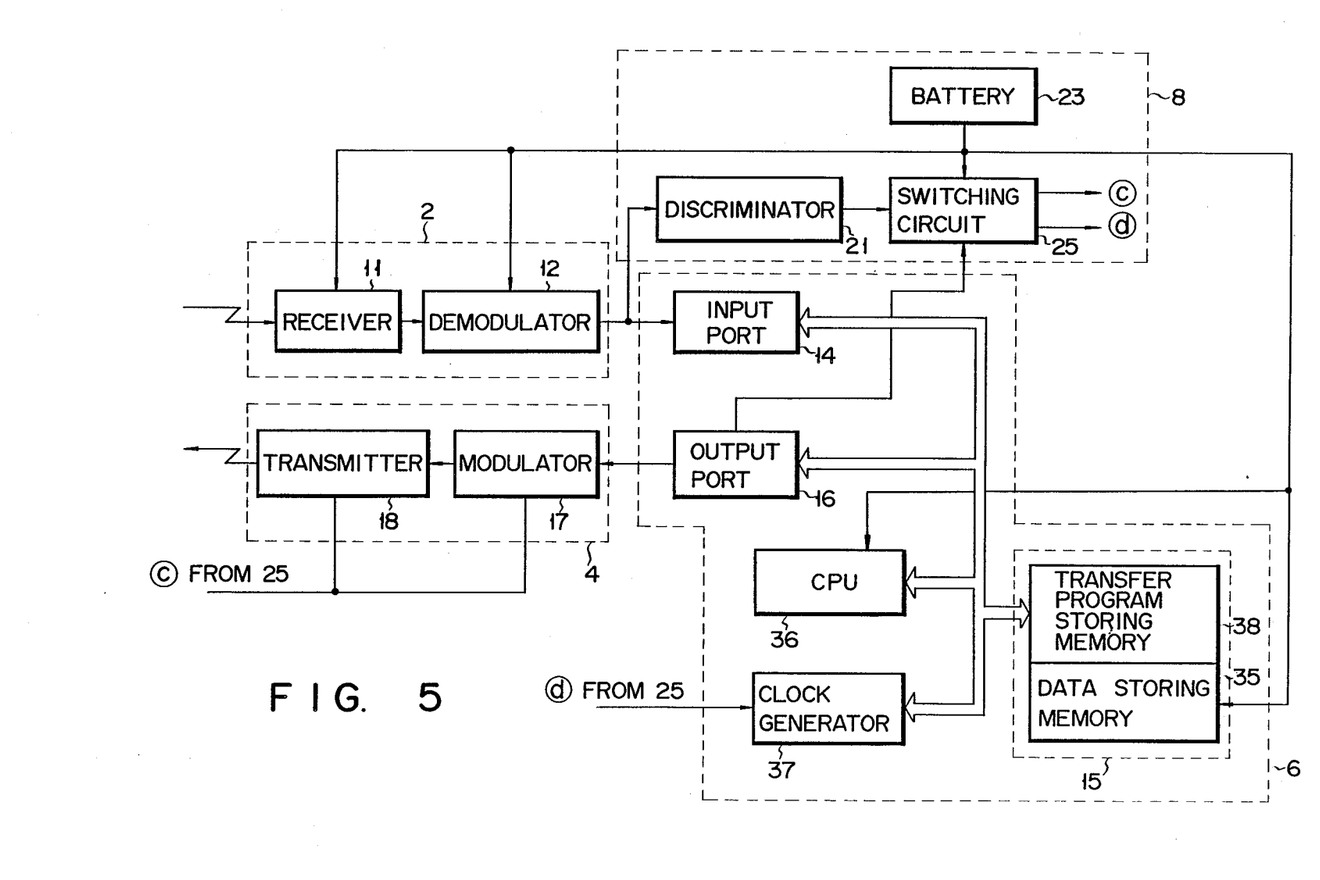
FIG. 5 is a block circuit diagram of an information medium according to a second embodiment of the invention.

A second embodiment of the present invention will now be described with reference to FIG. 5. In this figure, some of the components, which are identical with those of the first embodiment (FIG. 1), are designated by the same numerals, and are therefore not described in detail.

Memory unit 15 stores a plurality of transfer programs, and comprises transfer program storing memory 38 formed of a ROM such as an EEPROM, and data storing memory 35 of the same type as that of the first embodiment. Switching circuit 25 supplies power from buttery 23 to transmitting section 4, upon receipt of the "power supply start" signal supplied from discriminator 21, thus actuating transmitting section 4. A generation control signal from switching circuit 25 is supplied to clock pulse generator 27. In response to this generation control signal, generator 27 generates and supplies clock pulses to CPU 36.

Upon receipt of a "power supply stop" signal from output port 16, switching circuit 25 stops the power supply to transmitting section 4 and the supply of the generation control signal to clock pulse generator 37.

As a result, generator 37 stops supplying clock pulses to CPU 36, which in turn ceases operation.

Figure 6:
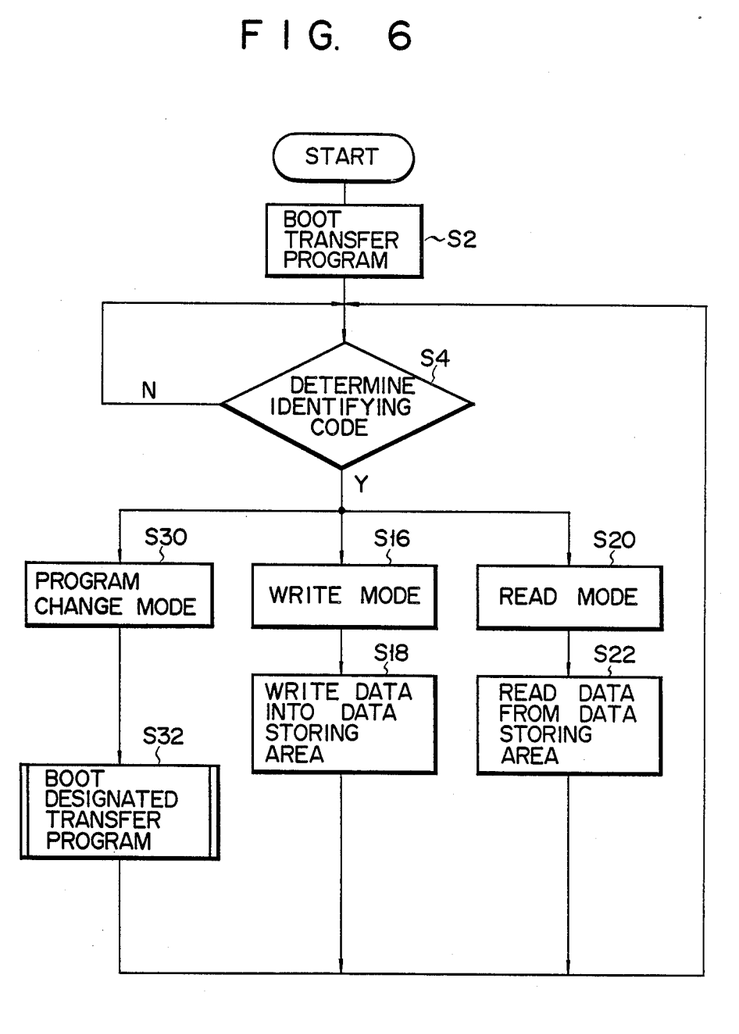
FIG. 6 is a flow chart illustrating the operation of the information medium of FIG. 5.

The operation of the second embodiment will be now explained with reference to the flow chart of FIG. 6. This flow chart differs rrom that of FIG. 4 only in respect of steps S8 to S14. Therefore, the following description is limited to these steps.

When, in step S4, the identifying code is found to specify a program-change instruction, step S30 is carried out to determine that the received instruction information is a program-change instruction. The number counted by the program counter up to this point is changed to the head address where the transfer program, designated by the data written in the data field following the identifying code field, is stored. Thereafter, when the end code written in the end code field following the data field is detected, the data corresponding to the designated transfer program is transmitted to the external device via transmitting section 4. When it is determined, in the external device, that the transfer program has been correctly changed, the external device outputs end instruction information. When the end instruction is supplied to the information medium, the designated transfer program is executed, in step 32. The flow of FIG. 6 then returns to step S4. The operation related to any other instruction information is performed in the same manner as in the first embodiment.

When a plurality of transfer programs are stored in transfer program storing memory 38, and the name of a program or the head address of the predetermined program is written in the data field following the program-change code, then it is possible to start any desired transfer program.

In the second embodiment, transfer-control section 6 is continuously supplied with power, and, clock pulse generator 37 supplies clock pulses to CPU whenever necessary.

What is claimed is:

1. An information system which can correctly communicate with an external device having instruction information, said system comprising:
   receiving means for receiving the instruction information from the external device;
   transmitting means for transmitting transmission data input thereto, to the external device;
   memory means for storing data, a transfer program, and a control program;
   transfer control means for storing, as data, into said memory means the content in a data field of the instruction information received by said receiving means in a write mode in accordance with the stored transfer program, and for storing, as the transfer program, into said memory means the content in the data field in a program change mode in accordance with the stored control program; and
   discriminating means coupled to said transfer control means and said transmitting means for discriminating an enabling code in an enabling code field of the instruction information received by said receiving means, and for selectively activating said transfer control means and said transmitting means in accordance with a result discriminated by said discriminating means.

2. The system according to claim 1, wherein said transfer control means further includes data-reading means for reading out, as the transmission data, from said memory means to said transmitting means the stored data designated by the content in the data field of the instruction information received by said receiving means in a read mode in accordance with the stored transfer program.

3. The system according to claim 2, wherein said transfer control means further includes decoding means for decoding an identification code in an identification field of the instruction information received by said receiving means, and for selectively setting one of a write mode, a read mode, and a program change mode in accordance with the decoded result.

4. The system according to claim 3, wherein the instruction information further includes an end code field in which an end code is written, said decoding means further includes means for decoding the end code, and for selectively cancelling one of the write mode, the read mode, and the program change mode.

5. The system according to claim 4, wherein said transfer means further includes means for reading out the stored transfer program as the transmission data from said memory means to said transmitting means in the program change mode in accordance with the stored control program, and said decoding means cancels the program change mode when the end code is decoded without the identification code and data fields after the stored transfer program is transmitted.

6. The system according to claim 4, further comprising battery means for supplying power to said receiving means, transfer control means, memory means, and transmitting means.

7. The system according to claim 6, further comprising switching means for supplying power from said battery means to said transfer control means and said transmitting means in accordance with a supply start signal, and for stopping the supply of the power in accordance with a supply stop signal, and wherein said discriminating means includes first generating means for generating the supply start signal to said switching means when the enabling code is discriminated to be a predetermined code in order to activate said transfer control means and said transmitting means, and said decoding means further includes second generating means for generating the supply stop signal when the end code is decided, and said receiving means is always supplied with the power.

8. The system according to claim 6, further comprising clock generating means for generating a clock signal, said transfer means operating in snchronism with the clock signal, and switching means for supplying the power form said battery means to said clock generating means and said transmitting means in accordance with a supply start signal, and for stopping the supply of the power in accordance with the supply stop signal, and wherein said discriminating means includes first generating means for generating the supply start signal to said switching means when the enabling code is discriminated to be a predetermined code in order to activate said transfer control means, said decoding means further includes second generating means for generating the supply stop signal when the end code is decoded, and said receiving means and said transfer control means are always supplied with the power.

9. The system according to claim 6, wherein said memory means includes a RAM for storing the data and the transfer program and sai RAM is always supplied with the power from said battery means.

10. The system according to claim 6, wherein said memory means includes a ROM for storing the control program and said ROM is supplied with the power upon operating.

11. The system according to claim 2, wherein said receiving means receives signals transmitted on electromagnetic waves, and generates the instruction information, and said transmitting means modules the transmission data output from said transfer-control means, into signals and transmits these signals on electromagnetic waves.

12. The system according to claim 2, wherein said receiving means receives signals transmitted on sound waves, and generates the instruction information, and said transmitting means modulates the transmission data output from said transfer-control means, into signals and transmits these signals on sound waves.

13. The system according to claim 2, wherein said receiving means receives signals transmitted on light beams, and generates the instruction information, and said transmitting means modulates the transmission data output from said transfer-control means, into signals and transmits these signals on light beams.

14. An information system which can correctly communicate with an external device, said medium comprising:
memory means for storing a plurality of transfer program and a plurality of types of data;
program-changing means for selecting a transfer program among the plurality of transfer programs in accordance with a program change instruction output, and for outputting the selected transfer program to the external device to ensure that the selected transfer program is correct;
write means for writing into said memory means at least one type of data written in a write instruction after the program change instruction, in accordance with the selected transfer program;
read means for reading out from said memory means to the external device at least one type of data designated by the content written in a read instruction after the program change instruction, in accordance with the selected transfer prpogram;
decoding means for decoding the content in an identification code of instruciion ionformation transmitted from the external device, and for selectively generating one of the program change instruction, the write instruction, and the read instruction in accordance with the decoded result; and
discriminating means for activating said program-changing means, said write means, said read means, and said decoding means when instruction information transmitted from the external device includes a predetermined code.

15. The system according to claim 14, wherein the instruction information including the program change instruction is the output from the external device repeatedly until it is ensured that the selected transfer program is correct.

16. The system according to claim 14, wherein said program-changing and write means receive signals transmitted on electromageetic waves, and generate the instruction information, and said program-changing and read means modulate at least one type of data and the selected transfer program into signals and transmit these signals on electromagnetic waves.

17. The system according to claim 14, wherein said program-changing means receive signals transmitted on sound waves, and generate the instruction information, and said program-changing and read means modulate at least one type of data and the selected transfer program into signals and transmit these signals on sound waves.

18. The system according to claim 14, wherein said program-changing and write means receive signals transmitted on light beams, and generate instruction information, and said program-changing and read means modulate at least one type of data and the selected transfer program into signals and transmit these signals on light beams.

* * * * *